(12) United States Patent
Bertani

(10) Patent No.: US 7,507,922 B2
(45) Date of Patent: Mar. 24, 2009

(54) HINGE WITH BUILT IN SAFETY SWITCH

(75) Inventor: Alberto Bertani, Milan (IT)

(73) Assignee: Elesa S.p.A., Milan (IT)

( * ) Notice: Subject to any disclaimer, the term of this patent is extended or adjusted under 35 U.S.C. 154(b) by 0 days.

(21) Appl. No.: 11/611,908

(22) Filed: Dec. 18, 2006

(65) Prior Publication Data
US 2007/0157431 A1    Jul. 12, 2007

(30) Foreign Application Priority Data
Jan. 12, 2006    (IT) .......................... MI20060007 U

(51) Int. Cl.
*H01H 3/16*    (2006.01)
(52) U.S. Cl. .................................. 200/61.7; 200/61.62
(58) Field of Classification Search ................. 200/61.7
See application file for complete search history.

(56) References Cited

U.S. PATENT DOCUMENTS

| 3,729,603 A | * | 4/1973 | Foltz | ........................ 200/61.7 |
| 3,742,162 A | * | 6/1973 | Wasemann | ................ 200/61.62 |
| 5,436,418 A | * | 7/1995 | Tamehira | ............... 200/61.58 R |
| 6,667,449 B2 | | 12/2003 | Wecke et al. | |
| 6,906,698 B2 | * | 6/2005 | Tachikawa et al. | ........... 345/156 |

FOREIGN PATENT DOCUMENTS

EP    1 239 496 A1    9/2002

* cited by examiner

*Primary Examiner*—Elvin G Enad
*Assistant Examiner*—Lheiren Mae A Anglo
(74) *Attorney, Agent, or Firm*—Pearne & Gordon LLP

(57) ABSTRACT

The invention concerns a hinge of the type consisting of two flap-shaped main components (1, 2), having a mutual-engagement area (3) on a common pivoting axis. The hinge provides that with one of the flaps (1, 2) there is integral a head (4) of the pivoting axis, having a cam-shaped profile, and that with the other flap (1, 2) there is associated a switch body (5) wherefrom a control pin (9) protrudes. An outer end of the control pin (9) engages with said cam-shaped profile, and an end inside the body (5) acts on a button (11) actuating a switch (10) arranged within said body (5).

17 Claims, 2 Drawing Sheets

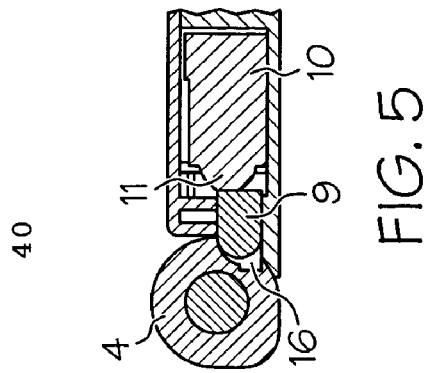
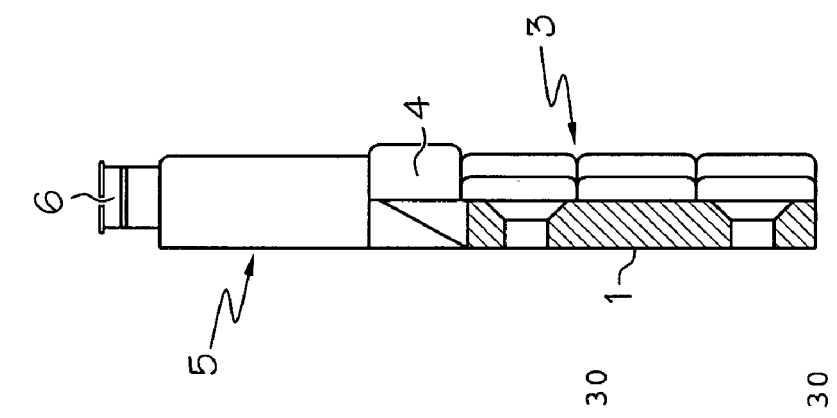
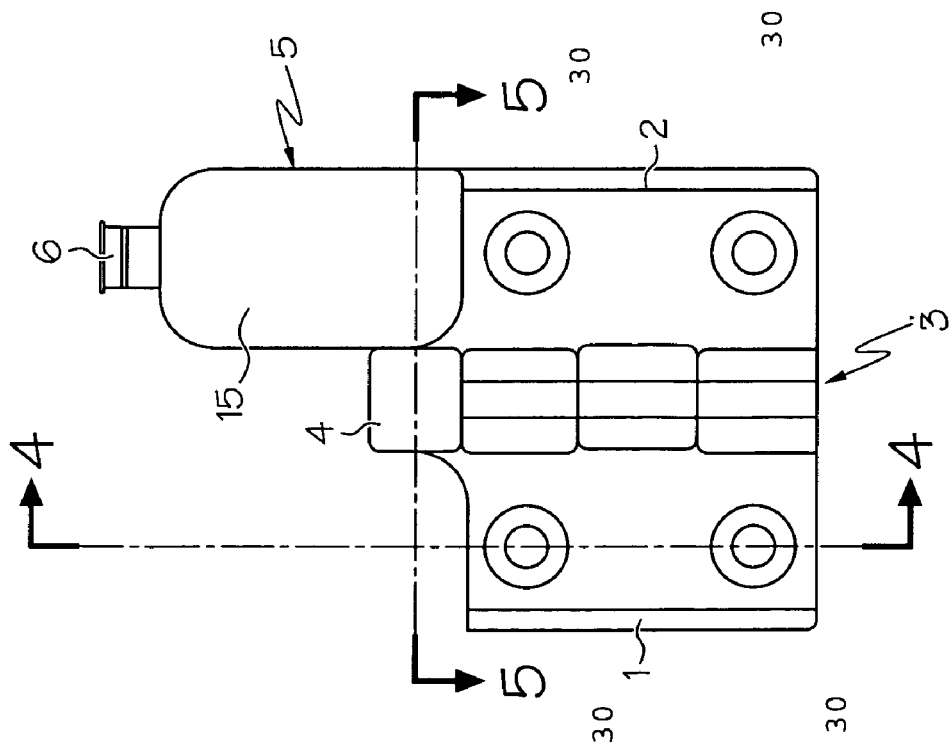

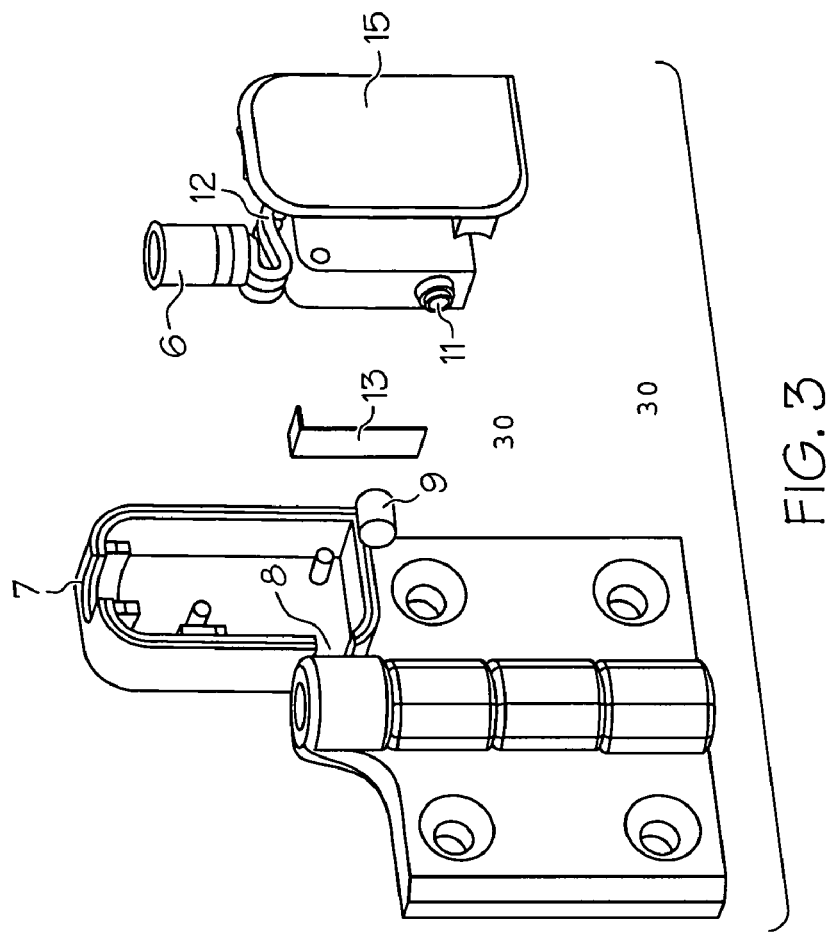
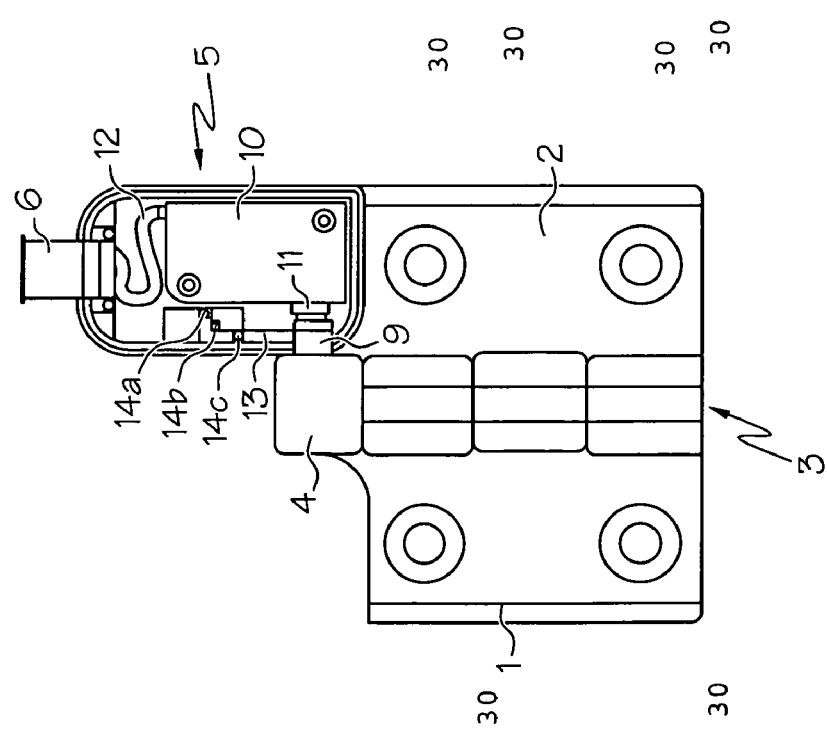
FIG. 3
FIG. 2

HINGE WITH BUILT IN SAFETY SWITCH

RELATED APPLICATIONS

This application claims the benefit of Italian application, MI2006U 000007, filed on Jan. 12, 2006, the entire disclosure of which is hereby incorporated herein by reference.

FIELD OF THE INVENTION

The present invention relates generally to a hinge, and more particularly to a hinge having an integrated safety switch.

BACKGROUND OF THE INVENTION

Hinges of this type have existed on the market for some time, and can be employed in industrial equipment, in particular for connecting bonnets, access doors, or the like to the frame of a casing of a machine containing the equipment, in cases wherein access to the inside of the casing is particularly dangerous when the same is running. Similarly, this kind of device may be used for ordinary access doors, for example, to signal the entry or exit of people.

For example, a hinge of this type, arranged on the bonnet or access door of a machine casing, is manufactured so that opening the bonnet causes the actuation of an electric switch suitably installed in the hinge body, which is then capable of issuing an opening signal, or of possibly stopping instantly the power supply to the machine motor, causing the machine to stop. It can thereby be ensured that the operator does not access the machine while the same is running. Similarly, in case of an access door, the safety switch actuates a bell, or another warning system.

For the sake of description simplicity, the term "door" will be used in the following to describe the movable part of the system whereon the hinge is mounted, regardless of it actually being a door of a piece of furniture, or of a car bonnet, or any other closing door of a compartment.

A hinge device of this type is described for example in patent EP 1,239,496 in the name of Bernstein, filed on 2 Feb. 2002. It consists of a 2-flap hinge, wherein one of the two flaps is shaped as a box-like body incorporating a switch system. This system may be operated through a control lever actuated by the rotation of one hinge flap with respect to the other.

More precisely—and as is evident from the examination of patent EP 1,239,496—within said box-like body forming a first hinge flap there is housed a microswitch, whose operation button is controlled by one end of said control lever, whose other end is pivoted in a fixed point of the box-like body, having a fulcrum function. A pin projecting from an intermediate position of the lever engages with a slot obtained in a member integral with the second hinge flap, under the action of a thrust spring. Said member integral with the second hinge flap is the same pin for the mutual rotation of the two hinges. When—due to the effect of the rotation of a hinge flap with respect to the other, during the hinge-supported door opening phase—said pin is pushed out of its slot, the control lever oscillates and operates said microswitch, which issues an electric warning signal of the door opening.

As can be understood, this arrangement has at least one important drawback: as a matter of fact, its construction is relatively complex—also in connection with the need to provide an adjustment system of the maximum width of the door opening angle, for which no warning signal is generated yet—and consequently costly, being easily damaged and necessarily requiring installation and maintenance by skilled staff.

It must also be pointed out that the above-described hinge is necessarily manufactured of a far greater size and with different, or differently-positioned, anchoring means with respect to those of normally-sold switch-less hinges. As can be understood, this represents a remarkable inconvenience in itself in all those cases in which it is necessary to install such a switch hinge as a replacement of a first conventional hinge, because in general there is no sufficient room nor coincidence of the anchoring points.

Moreover, in the majority of cases, this type of hinge is manufactured of a sturdy metal material—in order to supply the microswitch contained in the box-like body with sufficient protection from the deformations resulting from strong stresses on the doors—which becomes expensive.

The object of the present invention is to provide a hinge equipped with a switch which overcomes the disadvantages of the prior art. In particular, it is intended to provide an easy-to-install hinge, which is compact and allows full opening of the doors. A further object is to provide a hinge with a switch which may easily replace switch-less hinges which have been previously installed on the machine.

Yet another object is to obtain a hinge which cannot easily fall prey to acts of vandalism.

BRIEF DESCRIPTION OF THE DRAWINGS

The foregoing and other features and advantages of the present invention will become apparent to those skilled in the art to which the present invention relates upon reading the following description, given purely by way of example, with reference to the accompanying drawings, in which:

FIG. 2 is similar to FIG. 1, but shows the safety switch with the cover removed;

FIG. 3 is a perspective, exploded view of the hinge of FIG. 1;

DESCRIPTION OF EXAMPLE EMBODIMENTS

Figure 5:
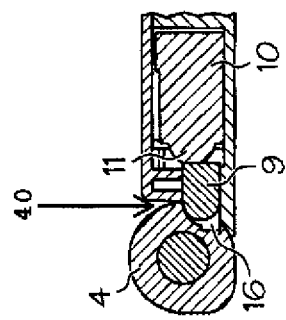
FIG. 5 is a section view of the hinge head according to the invention taken along section 5-5 of FIG. 1.

Certain terminology is used herein for convenience only and is not to be taken as a limitation on the present invention. Further, in the drawings, the same reference numerals are employed for designating the same elements.

Figure 1:
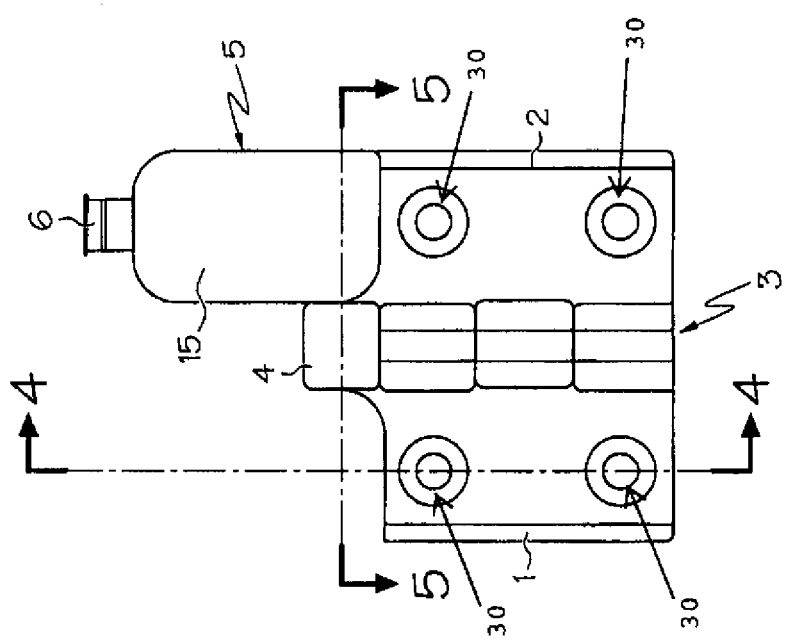
FIG. 1 is a front view of the hinge according to the invention.

Turning to the example shown in FIG. 1, the hinge according to the invention consists of two main components 1 and 2, which may be shaped as flaps or as hinge bodies—generally molded of a thermoplastic material, such as a technopolymer, but which may be made also of other materials, such as other synthetic materials, rubber, and/or metal. An example technopolymer can include a glass-fibre reinforced polyamide based (PA) technopolymer that is resistant to solvents, oils greases, and/or other chemical agents, though others can also be used. The hinge is shaped so as to have an area of mutual engagement 3 between the flaps 1, 2 on a common pivoting axis. For example, the flaps 1,2 can be connected by a hinge pin or the like that can float freely between the two flaps 1,2, or can even be secured to one of the flaps 1, 2.

At the top of the mutual engagement area 3 of said flaps 1, 2 there is provided a head 4 integral with flap 1 of the pivoting axis. Additionally, at the top of flap 2 there is anchored a switch body 5. The switch body 5 can be interchangeably or non-interchangeably anchored in various manners, such as by fasteners or adhesives, welding by heat and/or ultrasound, and/or it can even be formed with the flap 2. In addition or alternatively, the switch body 5 can also be provided on the opposite flap 1, with the understanding that corresponding opposite auxiliary structure as discussed herein can similarly be provided to flap 2.

As shown in FIG. 3, the switch body 5 can be generally box-shaped, such as a rectangular parallelepiped with rounded edges, though various other geometries can be used. The switch body 5 can be obtained by molding of a thermoplastic material or the like, and/or as discussed previously, can even be molded with one of the flaps 1, 2. At the top of the switch body 5 there is arranged a generally cylindrical connecting bushing 6. Moreover, along a side wall of the switch body 5 there are obtained two openings 7, 8, for the introduction of the above-mentioned connecting bushing 6, in a top position, and of an actuating pin 9, located near the head 4, respectively.

Inside said body 5 there is housed a commercially manufactured microswitch 10, equipped with a respective button 11 and with electric conductors 12, though various other elements can also be included. Various microswitches 10 can be utilized, such as various normally open and/or normally closed microswitches having various numbers of poles (e.g., single pole, single throw; single pole, double throw; single pole, changeover; double pole, single throw; double pole, double throw; double pole, changeover), though it is to be appreciated that various other types of microswitches can also be used. In addition or alternatively, the microswitch can set with a positive opening, such as a switch in compliance with the IEC/EN 60947-5-1 standard (International Electrotechnical Commission).

As shown in FIGS. 2 and 3, the button 11 lies in correspondence of the actuating pin 9, and between the two there is arranged a thin metal lamina 13, acting as a spring, which can be anchored at its upper end to the inside of body 5. For example, the thin metal lamina 13 can be anchored through three support pins 14a, 14b, 14c that are arranged so that lamina 13 is preloaded in order to bias the pin 9 towards the outside of body 5 (i.e., towards the head 4).

Electric conductors 12 connect with a male plug arranged inside of the bushing 6, and are capable of cooperating with a female socket (not shown) to the supply of electric power for the machine, and/or to various other sensing equipment of the machine.

Once the described assembly has been thus assembled, a cover 15 can be attached to close the body 5. The cover 15 can be removably or non-removably attached by fasteners, adhesives, and/or welded by heat and/or ultrasound.

The section of FIG. 5 highlights head body 4, whose outer surface is cam-shaped, capable of cooperating with pin 9. As can be easily observed in the drawing, in rest conditions (closed door, position of FIGS. 1 and 5) pin 9 is housed in slot 16 of the cam-profile of head 4, under the preload thrust of spring 13, and button 11 of microswitch 10 is in turn at rest. Said portion of the head (4) that is in abutment with the control pin (9) at the rest position provides a stop (40) to inhibit movement of said flap-shaped components beyond said rest position.

As also appears clearly from the drawings, the upper contour of the flap 1 and the switch body 5 are suitably shaped to allow the rotation by at least 180° of flap 1 with respect to flap 2, until mutual contact between the two flaps is obtained. Additionally, the operating angle of flap 1 with respect to flap 2 for actuation of the microswitch can be set to various angles, such as 4°, though other angles can also be used. Further, during usage over time, the operating angle can vary.

From the above-cited description, the operation of such a device is evident.

Figure 4:
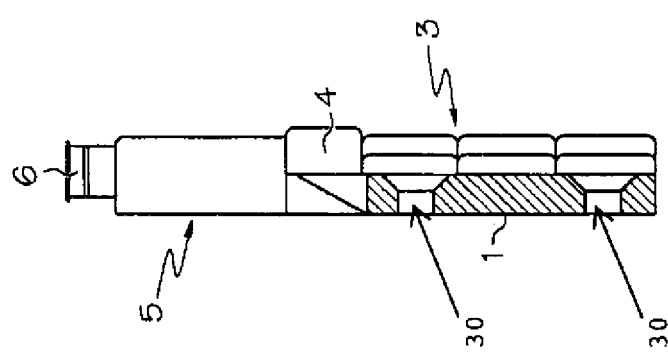
FIG. 4 is a section view of the hinge according to the invention, taken along the section 4-4 of FIG. 1.

The mounting operations for the hinge require anchoring the hinge to the door frame and to the door such as via at least one anchoring hole 30, (e.g., one stationary frame and one moving frame), such as through the anchoring holes shown in FIG. 4, and subsequently connecting an electric plug to the connecting bushing 6. The anchoring holes can be generally circular holes, and can include countersunk structure for use with countersunk head screws or the like. In addition or alternatively, the anchoring holes can include slotted holes for use with hexagonal head screws that can allow the adjustment (e.g., vertically and/or horizontally) of the hinge. The electric plug will then be connected on the other side to a machine stopping device, to a sound alarm or the like, and/or to a status indicator or the like, according to the objects for which the hinge has been mounted. For example, operation of the switch (e.g., from opening a door or service panel of a machine) can cause the power supply to the machine to be quickly interrupted.

When the door is opened, the pin 9 is forced by the generally cam-shaped profile of the head 4—which rotates integrally with flap 1 and consequently with the door—to slide towards button 11, which is activated and thereby actuates the safety circuit. It is to be appreciated that the stroke speed of the pin 9 does not depend upon the working speed of the hinge, and as such the pin 9 will slide towards the button 11 whether the hinge is operated relatively slowly or relatively quickly. Once the door has returned into a closed position, pin 9 will return into its housing inside the slot 16. Disengagement of the pin 9 from the button 11 is eased by the preload action of spring 13, which tends to bring pin 9 back into slot 16.

The desired objects have thereby been achieved. In particular, the hinge thus manufactured can be quickly and easily mounted by a user who is not necessarily a qualified installer.

A hinge equipped with a safety switch has furthermore been obtained, which can consist entirely of thermoplastic materials, and which therefore has dramatically improved lightness features over similar hinges found on the market.

Moreover, the hinge thus manufactured has the considerable advantage that the switch body 5—having, on one hand, a remarkably smaller bulk than those of the prior art and, on the other hand, being arranged over the hinge flap—does not interfere with the mutual rotation movement of the flaps, so that hinge opening may rotate at least 180°, depending on the operator's requirements.

Finally, the whole of body 5 and the corresponding microswitch 10 can be manufactured as a self-contained structure independent from the hinge, capable of cooperating with the same merely by the contact between cam-shaped head 4 and pin 9. Consequently, it is possible to mount a door to a machine frame by means of a hinge—whose shape and size are similar or even fully identical to those of the hinges already found on the market—said hinge comprising the switch body 5, 10, or even being switch-less. When the door is supported by multiple hinges, it is possible to provide that only one thereof be equipped with switch body 5. It is also possible, on the one hand, to mount the body 5 on the hinge interchangeably, so that it is possible to replace a damaged body 5 or to mount a body 5 into an already mounted hinge. On the other hand, it is possible to use the hinges interchangeably, which allows the user to mount a hinge with a switch as a replacement of a switch-less hinge, without it being necessary to carry out new drillings to anchor the hinge to the door.

It is also useful to underline that the invention also achieves the object of providing a hinge having properties which protect it from acts of vandalism and negligence. As a matter of fact, the switch associated with the hinge is manufactured so that intentional, accidental, or casual attempts at tampering determines the immediate stopping of the machine and/or the sounding of the alarm.

For example, by detaching the electric connector, the contact which was closed can open, thereby generating a signal. Moreover, where the cover has been previously ultrasound-welded, it is not possible to access the body or the microswitch except by tampering. It can therefore be necessary to use a certain force to unseal it, and often such an operation causes the breakage of the cover, thereby leaving evident marks of the break-in.

It is intended, however, that the protection of the invention described above is not to be considered limited to the specific embodiment shown, but extends to any other technically equivalent construction variant, falling within the scope of the accompanying claims.

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

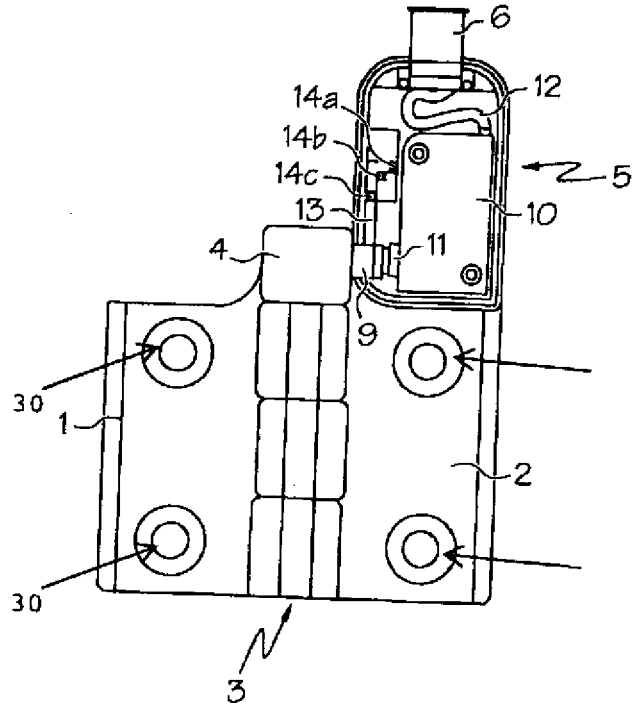

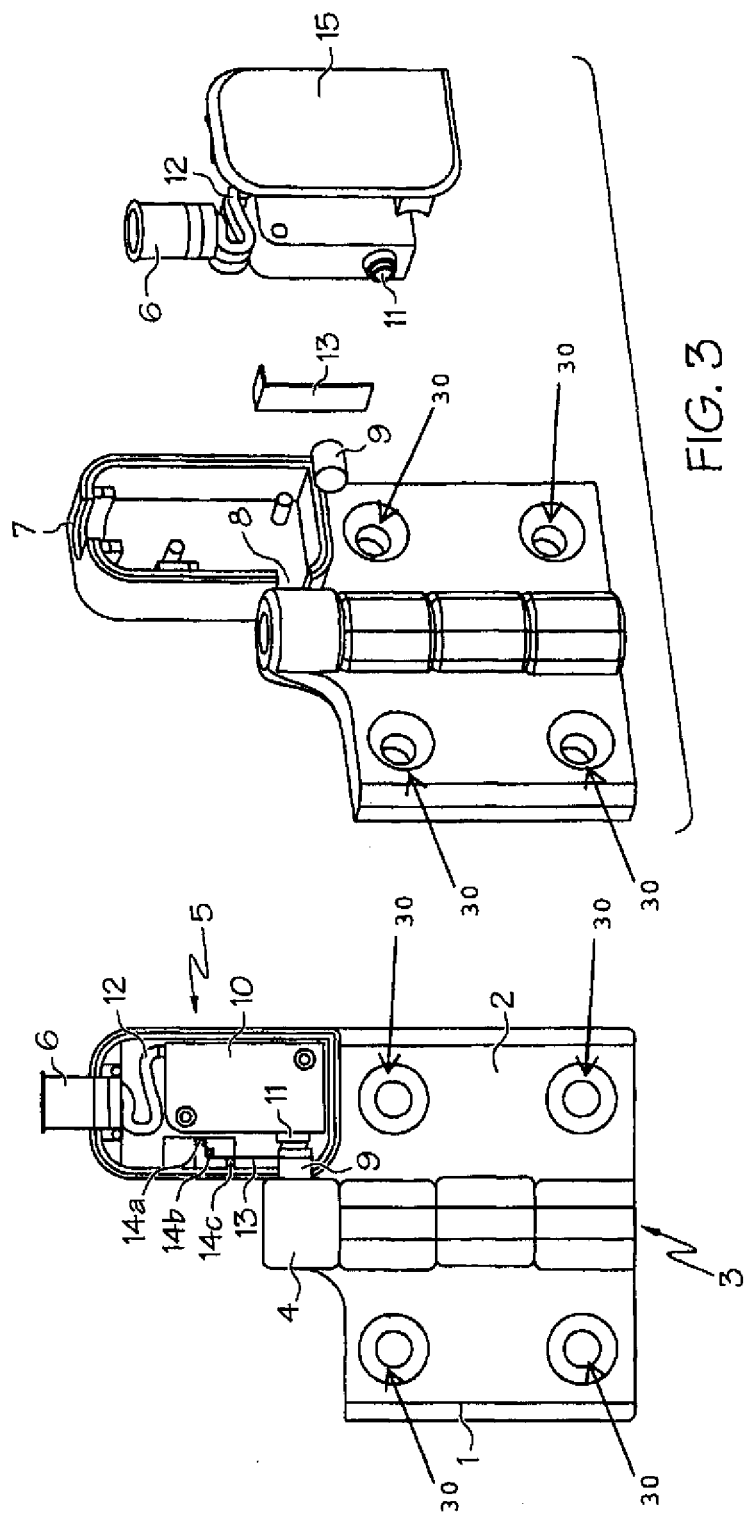

What is claimed is:

1. A hinge comprising two main flap-shaped components (1, 2) and a mutual engagement area (3) on a common pivoting axis, wherein with one of said flap-shaped components (1) there is integral a head (4) of the pivoting axis, having a cam-shaped profile, and in that with the other one of said flap-shaped components (2) there is associated a switch body (5), wherefrom a control pin (9) protrudes, whose outer end engages with said cam-shaped profile and whose end inside the switch body (5) cooperating with a power switch (10) arranged within said switch body (5), wherein the head (4) includes a slot which accommodates and receives the outer end of the control pin (9) when said flap-shaped components are in a rest position such that the power switch (10) is de-activated, and wherein a portion of the head (4) is in abutment with the control pin (9) at the rest position, such that when said flap-shaped components are moved away from the rest position the control pin (9) is forced by the cam-shaped profile to move toward the power switch (10) which is thereby activated, wherein each of said flap-shaped components (1, 2) includes at least one anchoring hole for mounting said hinge to a support surface.

2. The hinge as claimed in claim 1, wherein said switch body (5) is shaped as a rectangular parallelepiped box having rounded edges, which has on its side wall at least one opening (8) to let said control pin (9) through and which houses said power switch (10) inside.

3. The hinge as claimed in claim 2, wherein said power switch (10) is a commercially manufactured microswitch having its own push button (11), said pin 9 acting on said button (11).

4. The hinge as claimed in claim 1, wherein said power switch (10) is a commercially manufactured microswitch having its own push button (11), said pin 9 acting on said button (11).

5. The hinge as claimed in claim 1, wherein said switch body (5) is anchored to the upper edge of a flap (2), so as to allow the rotation by 180° of one flap (1) with respect to the other (2), up until mutual contact between the two flaps.

6. The hinge as claimed in claim 5, wherein said switch body (5) is interchangeably mounted on said flap (2).

7. The hinge as claimed in claim 5, wherein said switch body (5) is welded by ultrasound to said flap (2).

8. The hinge as claimed in claim 1, wherein said switch body (5) is formed integrally with said flap (2).

9. The hinge as claimed in claim 1, wherein the switch body (5) is shaped as an open box, which has a cover (15) welded by ultrasound.

10. The hinge as claimed in claim 1, wherein said hinge is made of technopolymer.

11. The hinge as claimed in claim 1, wherein one of said flap-shaped components (1, 2) is pivoted an operation angle of less than about 10 degrees relative to the other of said flap-shaped components (1, 2) when said flap-shaped components (1, 2) are moved away from said rest position.

12. The hinge as claimed in claim 1, wherein one of said flap-shaped components (1, 2) is pivoted an operation angle of less than about 5 degrees relative to the other of said flap-shaped components (1, 2) when said flap-shaped components (1, 2) are moved away from said rest position.

13. The hinge as claimed in claim 1, wherein said portion of the head (4) that is in abutment with the control pin (9) at the rest position provides a stop to inhibit movement of said flap-shaped components beyond said rest position.

14. A hinge comprising two main flap-shaped components (1, 2) and a mutual engagement area (3) on a common pivoting axis, wherein with one of said flaps (1) there is integral a head (4) of the pivoting axis, having a cam-shaped profile, and in that with the other flap (2) there is associated a switch body (5), wherefrom a control pin (9) protrudes, whose outer end engages with said cam-shaped profile and whose end inside the body (5) cooperating with a power switch (10) arranged within said switch body (5), wherein said switch body (5) is shaped as a rectangular parallelepiped box having rounded edges, which has on its side wall at least a first opening (8) to let said control pin (9) through and which houses said power switch (10) inside and a second opening to let through a connecting bushing (6) to a supply connector.

15. A hinge comprising two main flap-shaped components (1, 2) and a mutual engagement area (3) on a common pivoting axis, wherein with one of said flap-shaped components (1) there is integral a head (4) of the pivoting axis, having an outer surface with a slot and a cam-shaped profile, and in that with the other one of said flap-shaped components (2) there is associated a switch body (5), wherefrom a control pin (9) protrudes, whose outer end engages with said cam-shaped profile and whose end inside the body (5) cooperating with a power switch (10) arranged within said body (5), wherein the slot accommodates and receives the outer end of the control pin (9) when said flap-shaped components are in a rest position such that the power switch (10) is de-activated, and wherein a portion of the head (4) is in abutment with the control pin (9) at the rest position, such that when one of said flap-shaped components (1, 2) is pivoted an operation angle of less than about 10 degrees relative to the other of said flap-shaped components (1, 2), said flap-shaped components (1, 2) are moved away from said rest position and the cam-shaped profile engages and forces the control pin (9) to move toward the power switch (10) which is thereby activated, wherein said portion of the head (4) that is in abutment with the control pin (9) at the rest position provides a stop to inhibit movement of said flap-shaped components beyond said rest position.

16. The hinge as claimed in claim 15, wherein one of said flap-shaped components (1, 2) is pivoted an operation angle of less than about 5 degrees relative to the other of said flap-shaped components (1, 2) when said flap-shaped components (1, 2) are moved away from said rest position.

17. A hinge comprising two main flap-shaped components (1, 2) and a mutual engagement area (3) on a common pivoting axis, wherein with one of said flap-shaped components (1) there is integral a head (4) of the pivoting axis, having a cam-shaped profile, and in that with the other one of said flap-shaped components (2) there is associated a switch body (5), wherefrom a control pin (9) protrudes, whose outer end engages with said cam-shaped profile and whose end inside the switch body (5) cooperating with a power switch (10) arranged within said switch body (5), wherein the head (4) includes a slot which accommodates and receives the outer end of the control pin (9) when said flap-shaped components are in a rest position such that the power switch (10) is de-activated, and wherein a portion of the head (4) is in abutment with the control pin (9) at the rest position, such that when said flap-shaped components are moved away from the rest position the control pin (9) is forced by the cam-shaped profile to move toward the power switch (10) which is thereby activated, wherein said portion of the head (4) that is in abutment with the control pin (9) at the rest position provides a stop to inhibit movement of said flap-shaped components beyond said rest position.

\* \* \* \* \*

UNITED STATES PATENT AND TRADEMARK OFFICE
CERTIFICATE OF CORRECTION

| | | |
|---|---|---|
| PATENT NO. | : 7,507,922 B2 | |
| APPLICATION NO. | : 11/611908 | |
| DATED | : March 24, 2009 | |
| INVENTOR(S) | : Alberto Bertani | |

It is certified that error appears in the above-identified patent and that said Letters Patent is hereby corrected as shown below:

Title page should be deleted and substitute therefor the attached title page.

Drawings:
Replace drawings of Figures 1-5 with the attached replacement drawings.

Signed and Sealed this

Eighth Day of December, 2009

David J. Kappos
*Director of the United States Patent and Trademark Office*

(12) United States Patent
Bertani

(10) Patent No.: US 7,507,922 B2
(45) Date of Patent: Mar. 24, 2009

(54) HINGE WITH BUILT IN SAFETY SWITCH

(75) Inventor: Alberto Bertani, Milan (IT)

(73) Assignee: Elesa S.p.A., Milan (IT)

( * ) Notice: Subject to any disclaimer, the term of this patent is extended or adjusted under 35 U.S.C. 154(b) by 0 days.

(21) Appl. No.: 11/611,908

(22) Filed: Dec. 18, 2006

(65) Prior Publication Data
US 2007/0157431 A1 Jul. 12, 2007

(30) Foreign Application Priority Data
Jan. 12, 2006 (IT) .................. MI20060007 U

(51) Int. Cl.
*H01H 3/16* (2006.01)
(52) U.S. Cl. .................. 200/61.7; 200/61.62
(58) Field of Classification Search ............ 200/61.7
See application file for complete search history.

(56) References Cited

U.S. PATENT DOCUMENTS 3,729,603 A * 4/1973 Foltz ................. 200/61.7
3,742,162 A * 6/1973 Wasemann ............ 200/61.62
5,436,418 A * 7/1995 Tamehira ............ 200/61.58 R
6,667,449 B2 12/2003 Wecke et al.
6,906,698 B2 * 6/2005 Tachikawa et al. .......... 345/156

FOREIGN PATENT DOCUMENTS

EP          1 239 496 A1     9/2002

* cited by examiner

*Primary Examiner*—Elvin G Enad
*Assistant Examiner*—Lheiren Mae A Anglo
(74) *Attorney, Agent, or Firm*—Pearne & Gordon LLP

(57) ABSTRACT

The invention concerns a hinge of the type consisting of two flap-shaped main components (1, 2), having a mutual-engagement area (3) on a common pivoting axis. The hinge provides that with one of the flaps (1, 2) there is integral a head (4) of the pivoting axis, having a cam-shaped profile, and that with the other flap (1, 2) there is associated a switch body (5) wherefrom a control pin (9) protrudes. An outer end of the control pin (9) engages with said cam-shaped profile, and an end inside the body (5) acts on a button (11) actuating a switch (10) arranged within said body (5).

17 Claims, 2 Drawing Sheets